(No Model.) 4 Sheets—Sheet 4.
J. W. RHODES.
GRAIN DRILL.
No. 502,831. Patented Aug. 8, 1893.
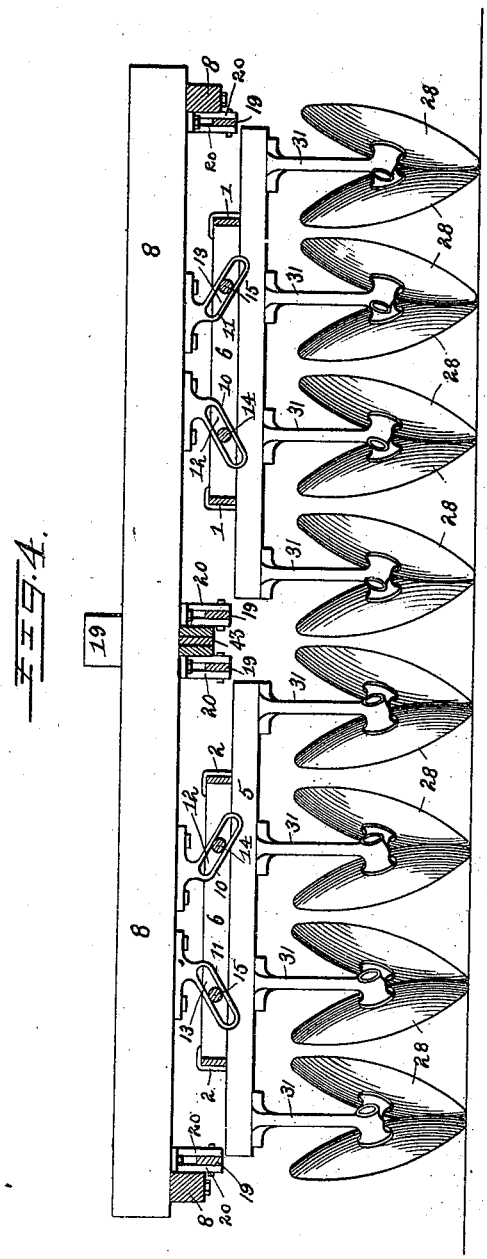
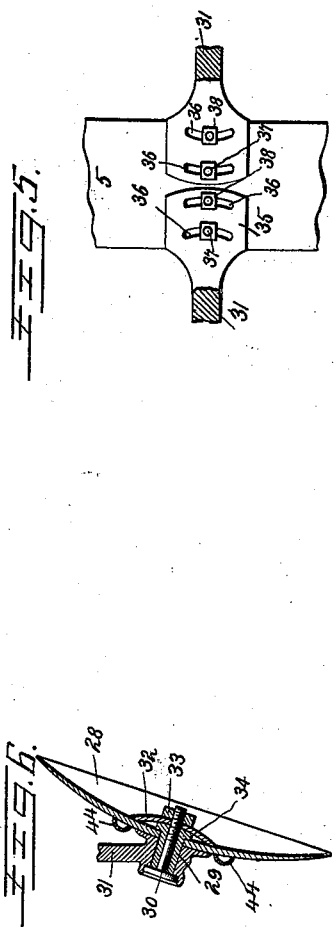
Witnesses:
Inventor:
John W. Rhodes
By Bond, Adams & Pickard
Attys.

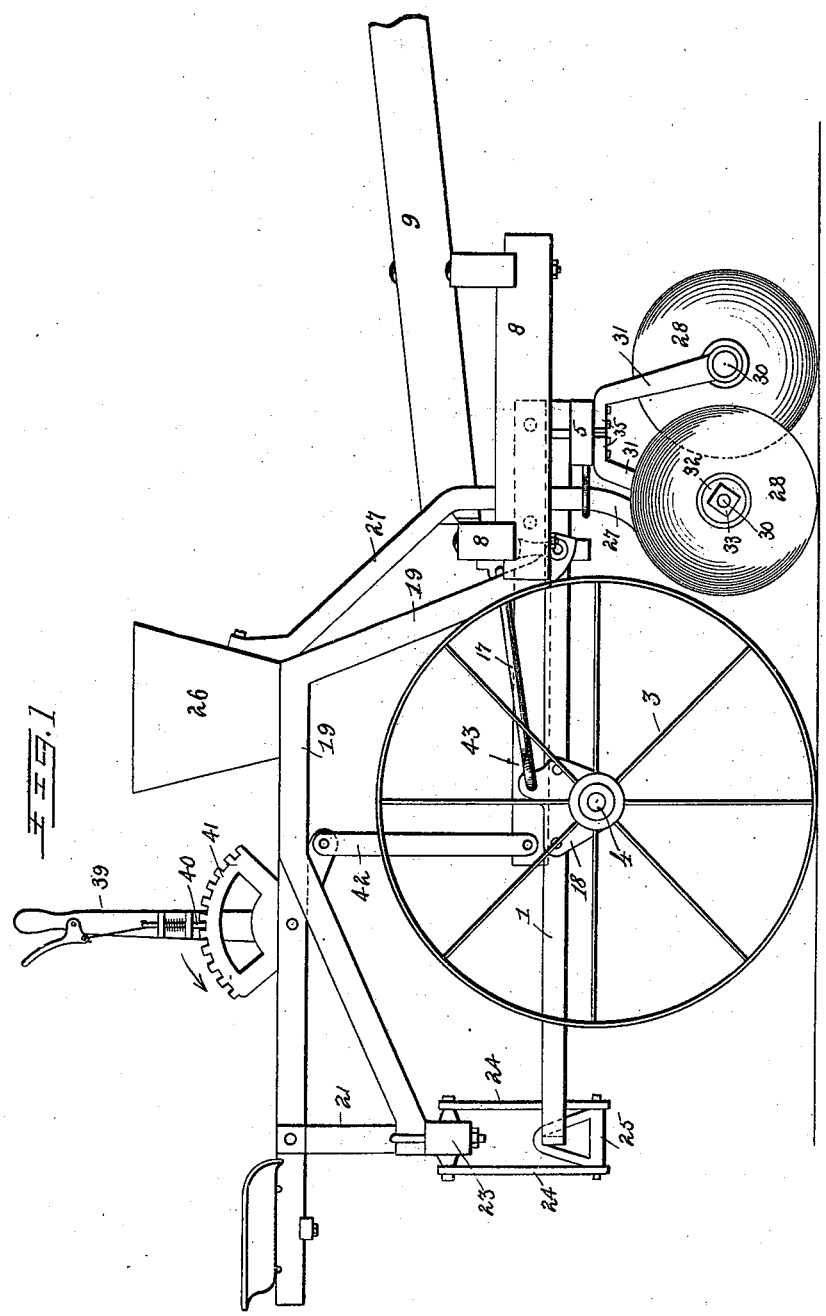

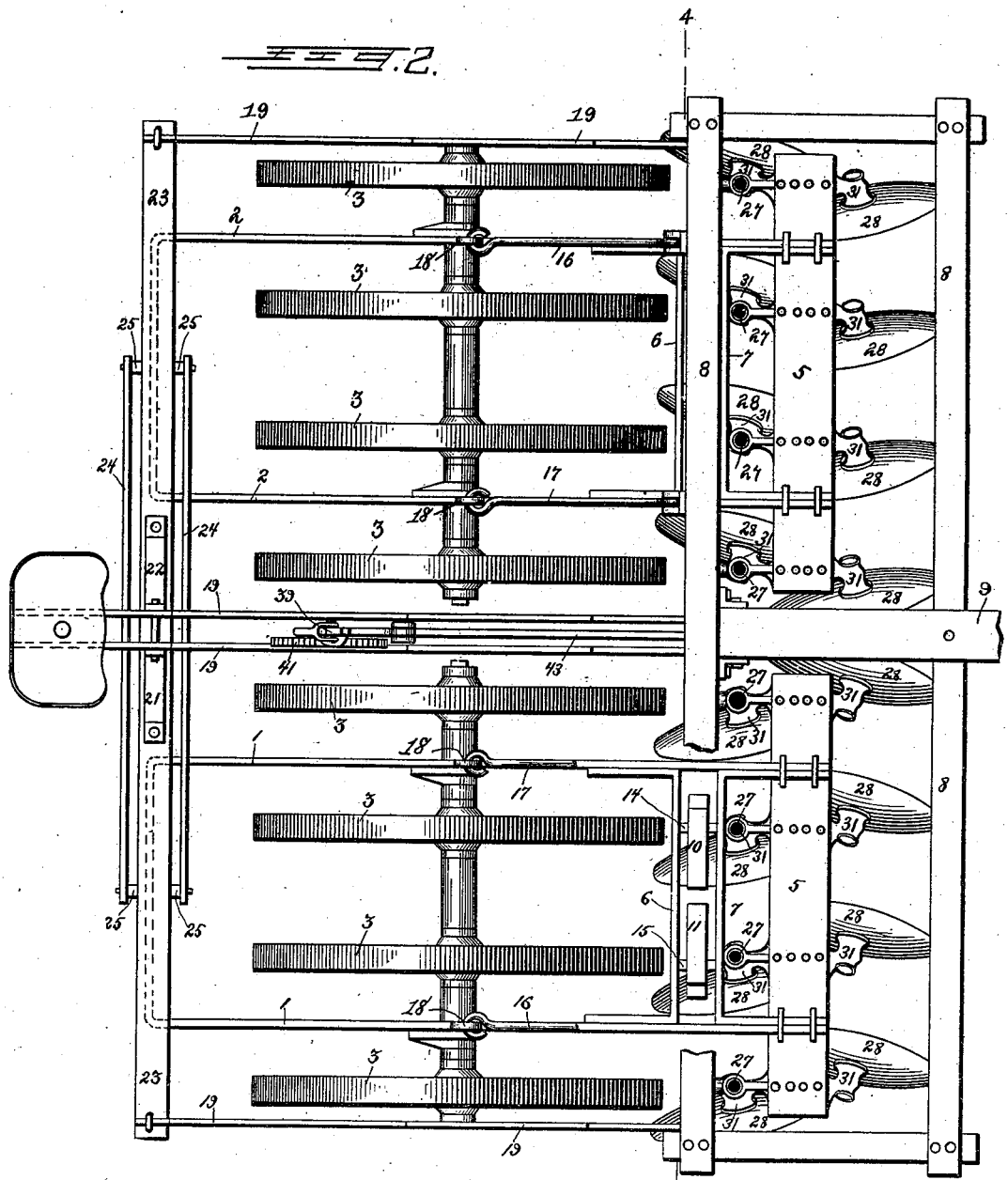

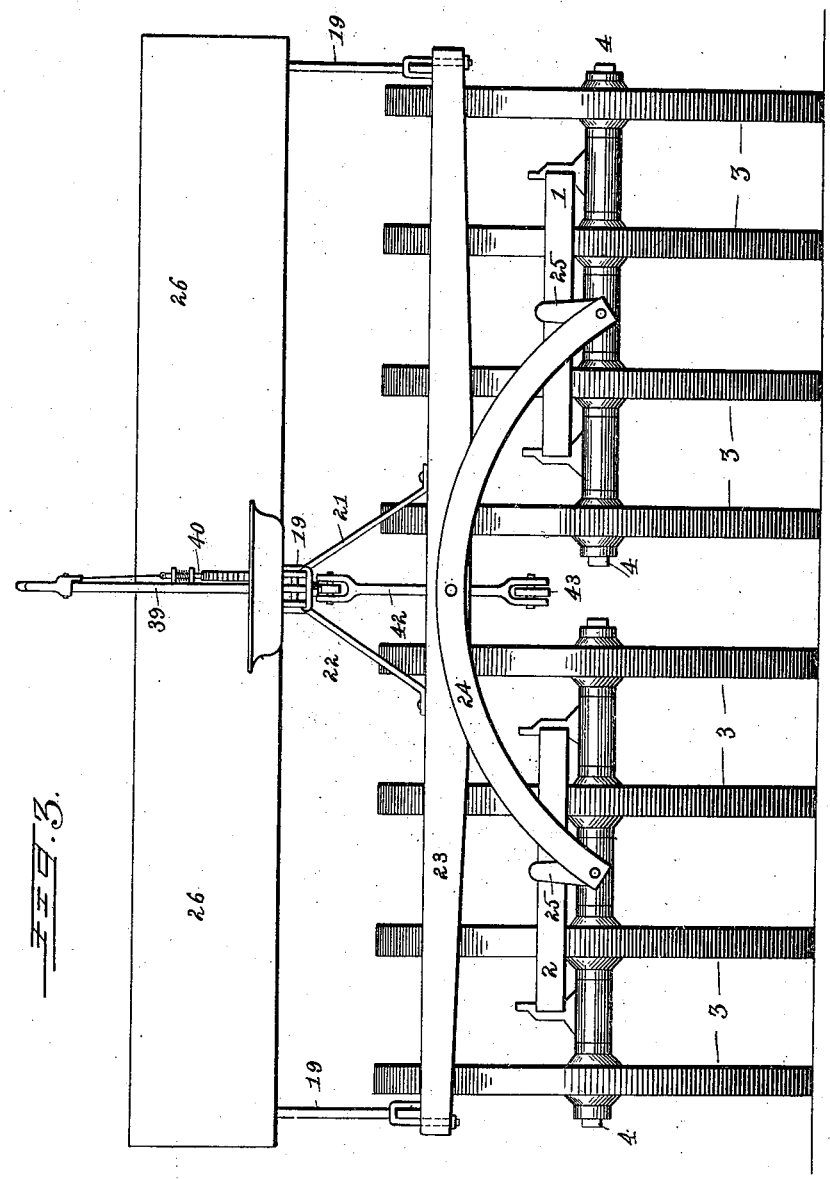

UNITED STATES PATENT OFFICE.

JOHN W. RHODES, OF HAVANA, ILLINOIS.

GRAIN-DRILL.

SPECIFICATION forming part of Letters Patent No. 502,831, dated August 8, 1893.

Application filed August 15, 1892. Serial No. 443,101. (No model.)

*To all whom it may concern:*

Be it known that I, JOHN W. RHODES, a citizen of the United States, residing at Havana, in the county of Mason and State of Illinois, have invented certain new and useful Improvements in Grain-Drills, of which the following is a specification, reference being had to the accompanying drawings, in which—

Figure 1 is a side elevation. Fig. 2 is a top or plan view. Fig. 3 is a rear elevation. Fig. 4 is a rear view of the disks, taken on line 4—4 of Fig. 2. Fig. 5 is a detail, being an under side view of one of the beams which carry the disks, showing the method of mounting the disks; and Fig. 6 is a central vertical section through one of the disks, showing the manner of attaching the disk to its standard.

My invention relates in part to grain drills, and particularly to that class commonly known as press drills, in which in addition to the seeding mechanism, a series of press wheels are provided, which follow in the furrows and press the seed in the ground; and my invention consists in certain improvements upon the devices shown in my Patents No. 355,716, dated January 11, 1887; No. 400,947, dated April 9, 1889; and No. 420,521, dated February 4, 1890. Heretofore in grain drills of this class it has been customary to attach the runners commonly used as furrow openers to open the furrow to receive the seed, to a front frame which extended entirely across the drill, and to provide for their adaptation to the inequalities of the ground by placing springs between the runners and the front frame. The hopper which carried the seed was attached to the front frame, and its whole weight was carried thereby. In my improved construction of grain drill the furrow openers, which may be either runners or disks, are mounted in gangs and are supported by separate frames, being mounted substantially as described in my Patent No. 420,521, except that instead of having one frame for the wheels and a separate frame for the furrow openers, a single frame is used for the furrow openers and wheels at each side of the drill, the wheel frame being extended far enough forward to permit of its supporting the furrow openers.

Another feature of my improved construction of grain drill consists in taking the hopper off the front frame and placing it upon the seat frame, which is supported at the rear by the distributing bar. The front end of the seat frame is supported at or near the pivotal point of the wheel and furrow opener frames. By this means all, or nearly all of the weight of the hopper and grain is transferred to the wheel frames, and by means of the distributing bar the weight is equally distributed over said frames.

My invention further consists in an improved furrow opener, which is adapted to be used in grain drills in place of the runners heretofore used for opening the seed furrow, and it is also adapted for any other purpose for which furrow openers are used. My improved furrow opener consists of two disks placed one behind the other in such manner that they will throw the dirt out on each side of the furrow to be opened. To secure this result ordinary disks are used, and they are mounted at opposite sides of the central line of the furrow, the portions of the disks which first enter the ground being approximately in the same line. To secure greater efficiency, I use convexo-concave disks, and instead of setting the disks perpendicularly, and depending on turning the inner face of the disk across the line of travel to throw the dirt out, I set the disks so that their edges, where they first enter the ground, and also at their lowest point in the ground, are approximately in the central line of the furrow to be opened. This causes the rear and upper portions of the disks to stand apart in such manner that the rear parts of the disks in revolving lift the ground up as they push it aside. The advantages gained by this construction are very great, as the draft is much lighter and the operator is enabled to handle the machine much more easily. The depth of the furrow may also be regulated as desired by the operator, and a much higher ridge may be thrown up between the planted rows of the grain; the farmer can also seed backward and forward across the field, leaving no ridges or low places in the operation.

A further improvement consists in arranging the furrow openers in gangs, each pair of disks being arranged similarly to each of the other pairs in the same gang, by which arrangement all the forward disks in each gang will be parallel, and all the rear disks in each gang will be parallel. This arrangement permits clods and stones to pass readily between the furrow openers, preventing the clogging up of the machine.

My invention further consists in a new and improved journal bearing for the disks, by the use of which the disks are firmly braced and dirt is prevented from getting into the bearings. An improved device for taking up wear is also provided. That which I regard as new will be set forth in the claims.

In the drawings,—1, 2 indicate rectangular frames, which are designed to carry the press wheels and furrow openers. (As these wheel and furrow opener frames are similar to each other, and are similarly mounted, it will be unnecessary to describe more than one of them, and corresponding parts of both frames will be marked by similar numbers of reference. The frames 1 and 2 will also be referred to as wheel frames, for convenience, but it will be understood that they carry the furrow openers also, as will be hereinafter more fully set forth.)

3 indicates wheels, which are mounted upon an axle 4, one of which axles is supported from each frame 1, 2. The forward ends of the frame 1 are rigidly connected to a transverse beam 5, which supports the furrow openers, as will be hereinafter described.

6, 7 indicate bars, which extend transversely of the frame 1 near its forward end.

8 indicates a draft frame, which is preferably rectangular in shape, and extends entirely across the machine, as shown in Fig. 2.

9 indicates the tongue, which is rigidly connected to the frame 8, as shown in Fig. 1.

10, 11 indicate slotted brackets which, at their upper ends, are rigidly connected to one of the bars of the frame 8, and depend therefrom. The brackets 10, 11 are provided with inclined slots 12, 13, as shown in Fig. 4. The upper ends of the slots 12, 13 are nearest each other, and the slots gradually recede from each other as they descend.

14, 15 indicate rods, which extend between the transverse bars 6, 7, and pass through the slots 12, 13 respectively, in which they are adapted to move. If desired, the rods 14, 15 may be provided with rollers. By this construction the forward ends of the wheel frames are supported from the draft frame 8, and a tilting side motion of the frames is permitted, substantially as described in my former patent, No. 420,521, hereinbefore referred to.

16, 17 indicate draft rods, the rear ends of which are connected to suitable brackets 18, mounted upon the axles 4 and secured to the wheel frames, their forward ends being connected to the draft frame 8, by which construction the greater part of the strain is removed from the wheel frames.

19 indicates the seat frame, the forward ends of which are pivotally swung from the rear portion of the draft frame 8, preferably by brackets 20. The pivots of the seat frame are so placed that they are substantially upon a line with the brackets 10, 11. By this construction the seat frame will have substantially the same pivot as the wheel frames. The seat frame 19 projects rearward from its pivots over the wheel frames, and it is provided at its rear end with a cross bar 23, which extends transversely of the machine and lies over the rear portion of the wheel frames, as shown in Figs. 2 and 3. That portion of the seat frame which carries the seat is braced from the bar 23 by braces 21, 22.

24 indicates a distributing bar, preferably curved, as shown in Fig. 3, the ends of which are swung by stirrups 25, or other suitable devices, from the rear portions of the wheel frames 1, 2, as shown in Fig. 3. The seat frame 19 is supported by the distributing bar 24, by which construction the weight of the driver is distributed evenly to the different press wheels, substantially as shown in my Patent No. 355,716.

26 indicates a hopper, which extends transversely of the machine and rests upon the seat frame 19, preferably near its forward end. The weight of the hopper, and the seed contained in it, is thereby distributed to the press wheels.

27 indicates tubes, which extend downward from the hopper 26, and terminate forward of and in line with the press wheels, as shown in Fig. 2.

28 indicates disks, each of which is mounted upon a sleeve 29, which is in turn mounted upon a bolt 30, carried by a standard 31. The standards 31 are carried by the beams 5, and are adjustably secured thereto, as will be hereinafter described. The disks 28 are held in place by means of circular plates 32, which are mounted upon the bolts 30 between the sleeves 29 and nuts 33 screwed upon the ends of the bolts. By screwing the nuts 33 upon the bolts the plates 32 may be tightly held in contact with the surface of the disks, and the edges of the plates being fitted to the inner surface of the disks, a very tight connection is secured. The lower portion of each of the standards 31 is enlarged and concaved to fit snugly against the rear surface of the disks, whereby a close joint is so secured at the rear of the disks. Each sleeve 29 is preferably provided with an annular flange 34 between the plate 32 and the disk. By this construction, when the nut 33 is tightened upon the bolt 30, the flange 34 will also tend to hold the disk tightly in place. If desired, the plate 32 may be formed with or secured to the sleeve 29, and the whole held in place by the bolt 30 and nut 33; the flange 34 would then be dispensed with.

44 indicates flanges or rings secured to the backs of the disks, around the base of the standard, to protect the bearing from sand and dirt. The angle at which the bolt 30 is mounted in the standard 31 is such that when the standard is in position upon the machine the lower front portion of the disk will be in substantially a vertical line, thereby throwing the upper and rear portions of the disk outward. The upper end of each standard 31 is bent over at the proper angle to the main body of the standard, and is flattened to form a plate 35, as shown in Fig. 5. The plate 35 is provided with curved slots 36, as shown.

37 indicates bolts which are carried by the plate 35, and project through the slots 36. The bolts 37 carry nuts 38 on the under sides of the plates 35. By this construction the standards may be partially rotated to change the angle of the disks to the line of motion of the drill, and thereby vary the width of the furrow to be opened.

39 indicates a lever, which carries a spring pawl 40, adapted to engage the notches of a segmental rack 41 mounted upon the seat frame 19. The lever 39 is of the bell crank type, and its lower arm is connected by a link 42 to a rod 43, the forward end of which is connected to the draft frame. By this construction, by operating the lever 39 in the direction indicated by the arrow in Fig. 1 the draft frame and the rear end of the tongue may be elevated, thereby raising the front ends of the wheel frames and lifting the disks from the ground. By operating the lever in the reverse direction the disks may be thrown into the ground. The furrow openers are arranged in gangs, one of which is carried by each wheel frame. The furrow openers consist of disks which are arranged in pairs one behind the other, and are arranged to throw the dirt out on each side of the furrow to be opened. This result is secured by inclining the disks to the line of draft in such manner that the portions of the disks which first enter the ground are approximately on the same line, and are substantially parallel to the line of forward motion, as best shown in Figs. 2 and 4. The lower front portions of the disks are substantially vertical. By this arrangement the disks are outwardly inclined at the top and rear in such manner that the rear parts of the disks lift the ground up as they push it aside, which operation secures a better defined furrow with a great deal less draft than it has heretofore been possible to obtain. The disks in each gang are also arranged as shown in Figs. 2 and 4, that is, each pair of disks is arranged similarly to each of the other pairs in the same gang. The disks of different gangs are, however, preferably arranged oppositely. By this arrangement clods and stones will pass between the disks easily without liability of clogging them up, as any clod or stone that could get in between the two front disks has an equal space through which to pass to the rear of the disks.

I am aware that heretofore disks have been placed one behind the other, for the purposes of cultivating the ground and to prevent the formation of ridges in the center between the gangs of disk harrows when being operated in the field, but in such cases the disks have been placed perpendicularly. I do not therefore broadly claim the placing of one disk behind the other, except when arranged as and for the purpose described, that is, as furrow openers.

Although I prefer to use the furrow openers shown and described upon my improved grain drill frame, I do not wish to limit myself to using my said frame in connection with such furrow openers, as for certain purposes, runners or other furrow openers may be used.

That which I claim as my invention, and desire to secure by Letters Patent, is—

1. In a grain drill, the combination with a draft frame, of one or more combined wheel and furrow opener frames, extending to the rear of the wheels upon which it is mounted, and coupling devices uniting said draft frame with the rear frame or frames, substantially as described.

2. In a grain drill, the combination with a draft frame, and one or more combined wheel and furrow opener frames, of coupling devices uniting said two frames, said coupling devices permitting a tilting side motion of said wheel and furrow opener frame or frames, substantially as and for the purpose specified.

3. In a grain drill, the combination with a draft frame, and one or more combined wheel and furrow opener frames, of couplings connecting said wheel and furrow opener frames to said draft frame and permitting the vertical tilting of said wheel and furrow opener frames, and means for tilting said wheel and furrow opener frames, whereby the furrow openers may be thrown into or out of the ground, substantially as described.

4. In a grain drill, the combination with a draft frame, of one or more combined wheel and furrow opener frames extending to the rear of the wheels upon which it is mounted, coupling devices uniting said draft frame with the rear frame or frames, a seat frame, a distributing bar supporting the rear end of the seat frame from said combined wheel and furrow opener frame or frames, devices supporting the forward end of the seat frame, and a hopper carried by the seat frame, substantially as described.

5. In a grain drill, the combination with a frame 1, and a beam 5 connected to the forward end of the frame, of wheels 3 carried by the said frame, furrow openers carried by the beam, a draft frame, and tilting coupling devices connecting the frame 1 with the draft frame for permitting vertical tilting of both of said frames, substantially as described.

6. In a grain drill, the combination with a frame 1, beam 5, cross bars 6 and 7, and pins 14 and 15 carried by said cross bars, of a draft frame, couplings 10 and 11 carried thereby, said couplings having slots 12 and 13 adapted to receive the pins 14 and 15, wheels carried by the frame 1, and furrow openers carried by the beam 5, substantially as described.

7. In a grain drill, the combination with a combined wheel and furrow opener frame, of a draft frame 8, coupling devices connecting the draft frame with the combined wheel and furrow opener frame and permitting vertical tilting of the latter, a lever 39 pivoted on the combined wheel and furrow opener frame, a bar 43 connected at its forward end with the draft frame, and a link 42 connecting the rear end of the said bar with the pivoted lever, substantially as described.

8. In a grain drill, the combination with a wheel frame, wheels carried thereby, and disk supporting devices, of disks 28 arranged in pairs in front of each wheel, said disks being inclined to cause the lower front portions thereof to lie in substantially vertical positions, substantially as described.

9. In a grain drill, the combination with a wheel frame, wheels carried thereby, and disk supporting devices, of disks 28 arranged in pairs in front of each wheel, said disks being outwardly inclined at the top and inwardly inclined at the front to cause their lower front portions to be substantially vertical and the portions which first enter the ground to lie parallel to the line of motion of the drill, substantially as and for the purpose specified.

10. The combination with a supporting standard, and a disk 28, of a sleeve 29, bolt 30, plate 32, and nut 33, substantially as and for the purpose specified.

11. The combination with a standard 31, and a disk 28, of means for securing said disk upon the standard, and a flange 44 on said disk for protecting the bearing from sand and dirt, substantially as and for the purpose specified.

12. In a grain drill, the combination with a wheel frame, wheels carried thereby, and a disk supporting frame, of disks 28 arranged in pairs in front of each wheel, each pair of disks being provided with a standard connected with the disk supporting frame and adapted to be partially rotated on its axis, and means for rigidly securing the standard in a fixed position after adjustment, substantially as described.

13. The combination with disk supporting devices, of disks arranged in pairs, one of the disks in each pair being forward of the other, said disks being outwardly inclined at the top and inwardly inclined at the front, so as to cause their lower front portions to be substantially vertical, and the portions of the two disks which first enter the ground to lie substantially parallel to the line of forward motion, substantially as and for the purpose specified.

14. The combination with disk supporting devices, of a pair of disks oppositely arranged one behind the other in such a manner that the portions of the two disks which first enter the ground lie substantially parallel to the line of forward motion, being approximately on the same line, and standards supporting said disks, said standards being adapted to be partially rotated on their axes, substantially as and for the purpose described.

15. The combination with disk supporting devices, of two disks located one behind the other and arranged to throw the dirt out on each side of the furrow to be opened, substantially as and for the purpose specified.

16. A furrow opener comprising two disks arranged one behind the other, and a presser wheel arranged to follow directly behind the disks, substantially as described.

17. The combination with disk supporting devices, of a gang of disks, said disks being arranged in pairs, one disk in each pair being located back of the other, and arranged to throw the dirt out on each side of the furrow to be opened, said pairs of disks being similarly arranged, whereby a clear space will be presented for the passage of stones and rubbish between said pairs of disks, substantially as described.

18. The combination of a series of furrow openers, each of said furrow openers consisting of two disks arranged in pairs one behind the other so as to throw the dirt out on each side of the furrow to be opened, the front disks of each gang throwing the dirt out in one direction, and the rear disks of each gang throwing the dirt out in an opposite direction, substantially as and for the purpose specified.

19. In a grain drill, the combination with a wheel frame or frames, of a wheel or wheels carried thereby, disk supporting devices, and disks arranged in pairs one behind the other in front of each wheel, so as to open a furrow by throwing the dirt out on each side of the furrow to be opened, substantially as described.

JOHN W. RHODES.

Witnesses:
  W. H. RHODES,
  C. H. RHODES.